(No Model.)
C. F. PIKE.
CARRIER FOR PNEUMATIC DESPATCH TUBES.
No. 562,023. Patented June 16, 1896.
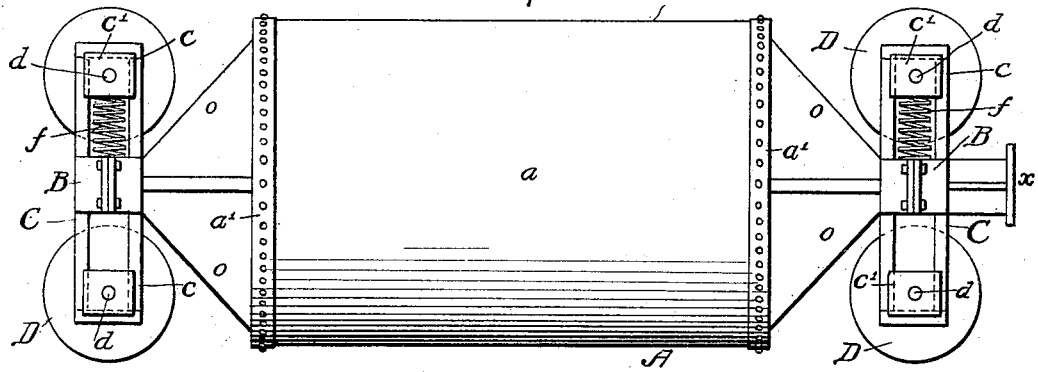
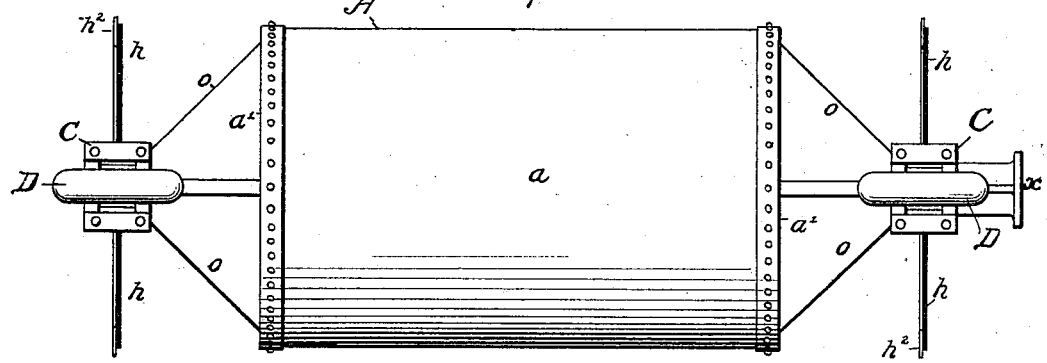
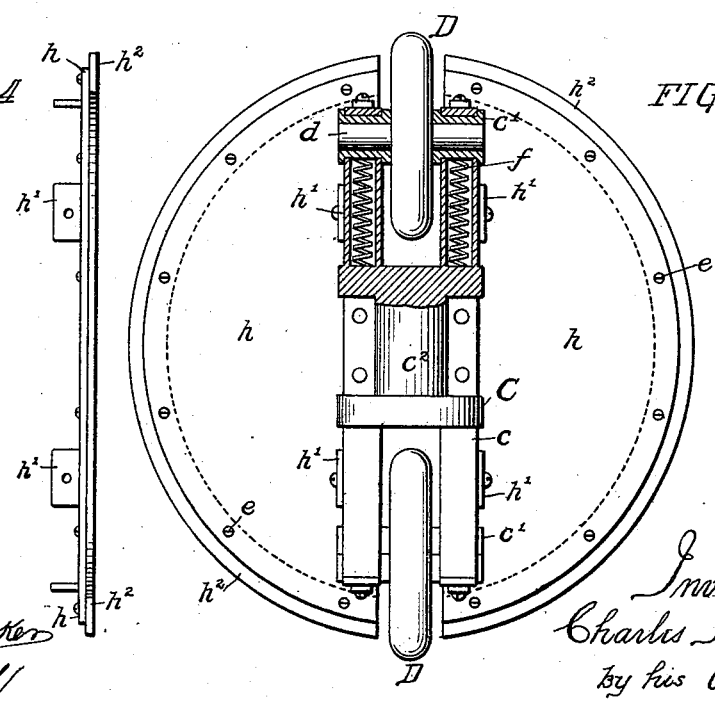
Witnesses:
Inventor:
Charles F. Pike
by his Attorney,
William A. Pike

UNITED STATES PATENT OFFICE.

CHARLES F. PIKE, OF PHILADELPHIA, PENNSYLVANIA.

CARRIER FOR PNEUMATIC-DESPATCH TUBES.

SPECIFICATION forming part of Letters Patent No. 562,023, dated June 16, 1896.

Application filed May 31, 1895. Serial No. 551,220. (No model.)

*To all whom it may concern:*

Be it known that I, CHARLES F. PIKE, a citizen of the United States, residing at Philadelphia, in the county of Philadelphia and State of Pennsylvania, have invented certain new and useful Improvements in Carriers for Pneumatic-Despatch Tubes, of which the following is a specification, reference being had therein to the accompanying drawings.
My invention has relation to carriers for pneumatic-despatch tubes, and particularly to that class in which the carriers are mounted on wheels which travel on rails or grooves within the tube, and has for its object the mounting of such wheels so as to lessen and diminish their running friction as much as possible and permit them to conform to all the curves and irregularities of the rails or grooves in the tube without any increase of friction, thereby obtaining increased speed with a minimum amount of power.

My invention accordingly consists of the combinations, constructions, and arrangements of parts comprising a carrier mounted on wheels, as hereinafter described in the specification, and pointed out in the claims.

Reference is had to the accompanying drawings, wherein—

Figure 1 is a side elevation of a carrier with the windage-wings omitted. Fig. 2 is a plan view of the same, showing the windage-wings. Fig. 3 is an end view of the carrier with the cap of the journal-box B removed and partly sectional, showing the pivoted journaled housing or frame for the wheel D and the windage-wings. Fig. 4 is an edge view of one of the windage-wings.

A is the carrier, which may be of any suitable size and configuration as desired or the requirements of service demand, and is provided with a suitable door or removable cover, as is usual, and which is not shown in the drawings, as its construction is well known.

$a$ is the shell or body.

$a'$ $a'$ are heads rigidly secured to the shell $a$ by rivets or in any other suitable manner desired. To each of the heads $a'$ $a'$ are secured the brackets $o$ $o$, which may be of any desired construction or configuration, or they may be formed on and be part of the heads and have at their ends a vertical journal-box B, which may be of any suitable construction desired. Housings C C have at their upper and lower ends $c$ $c$ boxes or bearings $c'$ $c'$, of any suitable construction desired for the reception of the journals or axles $d$ $d$ of the wheel D, the part $c^2$ of the frame or housing C, midway between its ends $c$ $c$, being formed into a journal for support and movement in the box B, in which it is mounted, as shown more plainly in Fig. 3. The lower boxes or bearings $c'$ are stationary. The upper boxes or bearings $c'$ are constructed so as to slide in the housings C and are provided with outwardly-acting springs $f$ (see more plainly Figs. 1 and 3) to keep the upper wheels D in positive contact and allow them to yield to any irregularities in the gage of the trackway. If desired, a bumper $x$ may be secured to the journal-box B and may be of any desired construction and configuration.

As it is not practical to have the body of the carrier fill the tube the carrier is provided with windage-wings $h$ $h$ to fill the tube within the distance desired from the interior of the tube. The windage-wings $h$ $h$ are secured to the housing C by the knees $h'$ $h'$ $h'$ $h'$ (see more plainly Figs. 3 and 4) or in any other suitable manner on a line through or near the vertical center of the housing and moving with it when it oscillates to conform to a curve in the tube and always remaining central with the interior of the tube. The wings are provided with the removable extension-ring $h^2$, which may be made of any suitable material and is riveted to the wings, as shown in Fig. 3 at $e$ $e$ $e$. When a larger or smaller cross-sectional area of windage is required, or the ring becomes worn or played, or from any cause whatsoever it is desirable, the ring may be removed and replaced with another. These wings are shown on both housings; but one only may be used, if desired. By this construction the wheels readily conform to the curves and irregularities of the tube without undue increase of friction, which permits carrying a load at speed with a minimum amount of power, and the body of the carrier can be made of a maximum diameter consistent with freedom of movement.

It is obvious that the details of construction may be varied without departing from the spirit of my invention, and hence I do not confine myself to the constructions herein shown and described.

Having thus described my invention, what I desire to claim and secure by Letters Patent is—

1. In a carrier for a pneumatic-despatch tube, the combination of a carrier-body composed of a shell with a head secured to each of its ends, a projecting journal-box rigidly secured to each of said heads, and a housing provided with a pair of alining wheels journaled to oscillate in said projecting journal-boxes, substantially as set forth.

2. In a carrier for a pneumatic-despatch tube, the combination of the shell $a$, heads $a'$ $a'$ provided with the projecting journal-boxes B B, the housings C C journaled for support and oscillation in said journal-boxes and provided with the boxes $c'$ $c'$ to receive the axles $d$ $d$ of the wheels D D, substantially as set forth.

3. A pneumatic-despatch-tube carrier-body having at each end a journaled housing, a pair of alining wheels for each housing and windage wings or disks attached to one or both of said housings substantially as set forth.

4. A pneumatic-despatch-tube carrier-body having at each end a journaled housing, a pair of alining wheels for each housing, and windage wings or disks attached to one or both of said housings, with a removable extension-ring attached to said wings.

In testimony whereof I have affixed my signature in presence of two witnesses.

CHARLES F. PIKE.

Witnesses:
 THOS. S. RODGERS,
 JOHN H. HUDSON.